(12) United States Patent
Chae et al.

(10) Patent No.: US 10,091,809 B2
(45) Date of Patent: Oct. 2, 2018

(54) METHOD AND APPARATUS FOR TRANSMITTING UPLINK SIGNAL IN WIRELESS LAN SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/327,198

(22) PCT Filed: Jul. 21, 2015

(86) PCT No.: PCT/KR2015/007569
§ 371 (c)(1),
(2) Date: Jan. 18, 2017

(87) PCT Pub. No.: WO2016/013851
PCT Pub. Date: Jan. 28, 2016

(65) Prior Publication Data
US 2017/0171880 A1    Jun. 15, 2017

Related U.S. Application Data

(60) Provisional application No. 62/031,148, filed on Jul. 30, 2014, provisional application No. 62/027,235, filed on Jul. 21, 2014.

(51) Int. Cl.
*H04W 72/12*    (2009.01)
*H04W 72/04*    (2009.01)
(Continued)

(52) U.S. Cl.
CPC ... *H04W 72/1284* (2013.01); *H04W 72/0413* (2013.01); *H04W 72/0446* (2013.01); *H04W 84/12* (2013.01); *H04W 88/02* (2013.01)

(58) Field of Classification Search
None
See application file for complete search history.

(56) References Cited

U.S. PATENT DOCUMENTS

2009/0111445 A1    4/2009  Ratasuk et al.
2010/0281323 A1*  11/2010  Wang ............... H04B 7/15507
                                                              714/748
(Continued)

FOREIGN PATENT DOCUMENTS

WO    WO 2013/165138 A1    11/2013

OTHER PUBLICATIONS

Catt, "Support of Multiple Timing Advances in LTE-A Rel-11 with CA," 3GPP TSG RAN WG1 Meeting #66bis, R1-112946, Zhuhai, China, Oct. 10-14, 2011, pp. 1-4.

(Continued)

*Primary Examiner* — Hong Cho
(74) *Attorney, Agent, or Firm* — Birch, Stewart, Kolasch & Birch, LLP

(57) ABSTRACT

One example of the present invention relates to a method for transmitting, by a terminal, an uplink signal in a wireless communication system, the method comprising the steps of: receiving a TA command in subframe n; and transmitting the uplink signal by applying the TA command in subframe n+6, wherein if the terminal transmits a scheduling assignment (SA) in subframe n+b (1<b<6), the SA comprises a TA value, the TA value being the TA value applied to the subframe n+b.

12 Claims, 8 Drawing Sheets

(51) Int. Cl.
*H04W 88/02* (2009.01)
*H04W 84/12* (2009.01)

(56) References Cited

U.S. PATENT DOCUMENTS

2012/0106407 A1* 5/2012 Papasakellariou ...... H04L 5/001
 370/280
2013/0272235 A1 10/2013 Tseng

OTHER PUBLICATIONS

Huawei et al., "Uplink Timing Advance for CoMP," 3GPP TSG RAN WG1 Meeting #68bis, R1-120991, Jeju, Korea, Mar. 26-30, 2012, 4 pages.

* cited by examiner

FIG. 5
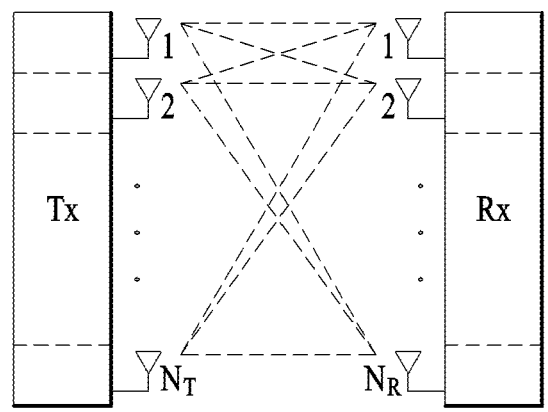
(a)
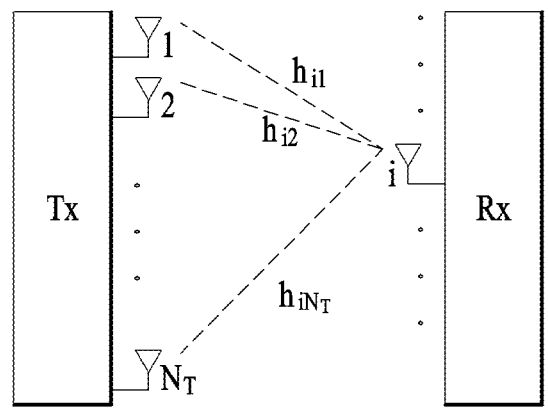
(b)

FIG. 7
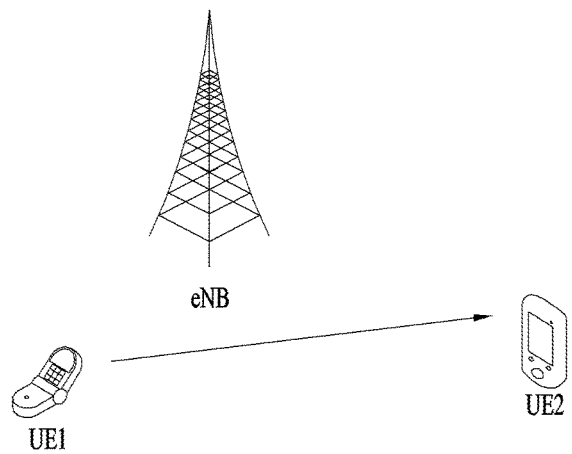
(a)
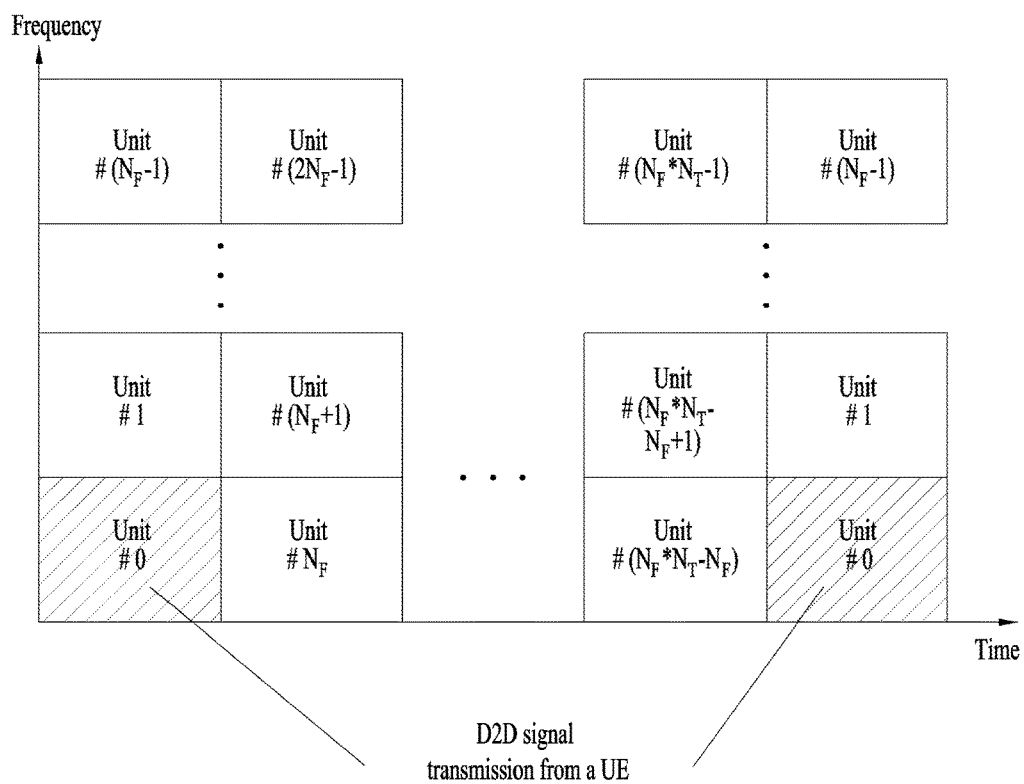
(b)

METHOD AND APPARATUS FOR TRANSMITTING UPLINK SIGNAL IN WIRELESS LAN SYSTEM

CROSS REFERENCE TO RELATED APPLICATIONS

This application is the National Phase of PCT International Application No. PCT/KR2015/007569, filed on Jul. 21, 2015, which claims priority under 35 U.S.C. 119(e) to U.S. Provisional Application No. 62/027,235, filed on Jul. 21, 2014 and 62/031,148, filed on Jul. 30, 2014, all of which are hereby expressly incorporated by reference into the present application.

TECHNICAL FIELD

The present invention relates to a wireless communication system, and more particularly, to a method and apparatus for transmitting an uplink signal for a transmission of SA including a trimming advance in a D2D communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

The technical task of the present invention is to provide a method of how to configure a TA included in case of SA transmission and a related uplink signal transmitting method.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of transmitting an uplink signal by a user equipment in a wireless communication system, including receiving a TA command in subframe n and transmitting the uplink signal by applying the TA command in subframe n+6, wherein if the user equipment transmits SA (scheduling assignment) in subframe n+b (1<b<6), the SA includes a TA value and wherein the TA value comprises a TA value applied to the subframe n+b.

In a second technical aspect of the present invention, provided herein is a user equipment in transmitting an uplink signal in a wireless communication system, including a transmitting module and a processor configured to receive a TA command in subframe n and transmit the uplink signal by applying the TA command in subframe n+6, wherein if the user equipment transmits SA (scheduling assignment) in subframe n+b (1<b<6), the SA includes a TA value and wherein the TA value comprises a TA value applied to the subframe n+b.

The following matters may be included entirely or in part in the first and second technical aspects of the present invention.

The TA value applied to the subframe n+b may be obtained by applying a change to a value of the received TA command.

The change applied to the value of the received TA command may be a change of 3.5 Ts per 200 ms.

The change applied to the value of the TA command may be selectively applied by the user equipment.

If the user equipment transmits the SA at least two times within an SA period, the SA after a second SA transmission may include a TA value included in a first SA transmission.

The TA value included in the first SA transmission may be a value applied to the subframe n+b.

Advantageous Effects

According to the present invention, by defining TA to be included in SA, D2D communication can be efficiently performed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for configuration of a wireless communication system having multiple antennas.

FIG. 6 and FIG. 7 are diagrams to describe D2D communication.

BEST MODE FOR INVENTION

Figure 1:
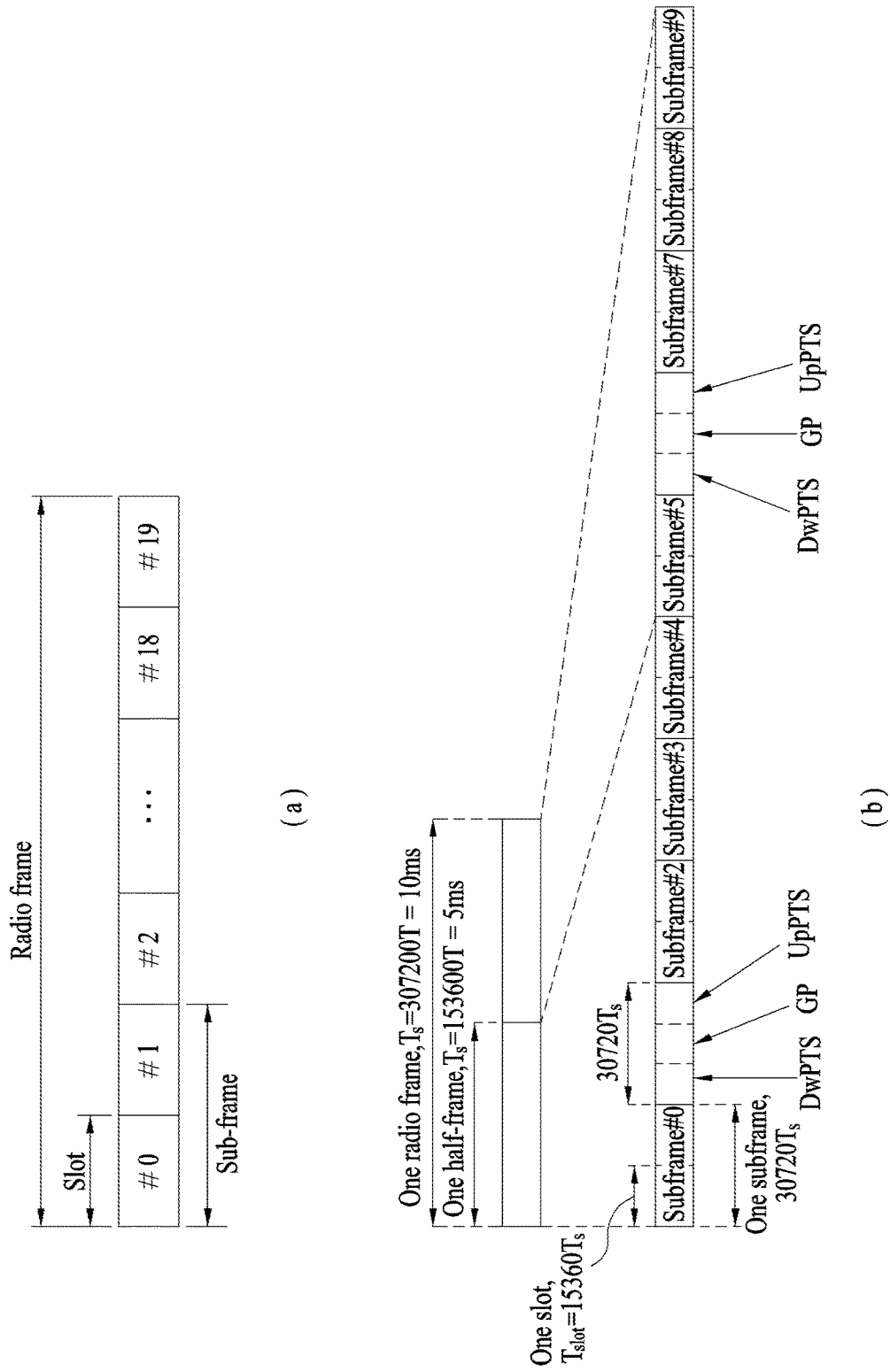
FIG. 1 is a diagram to illustrate a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
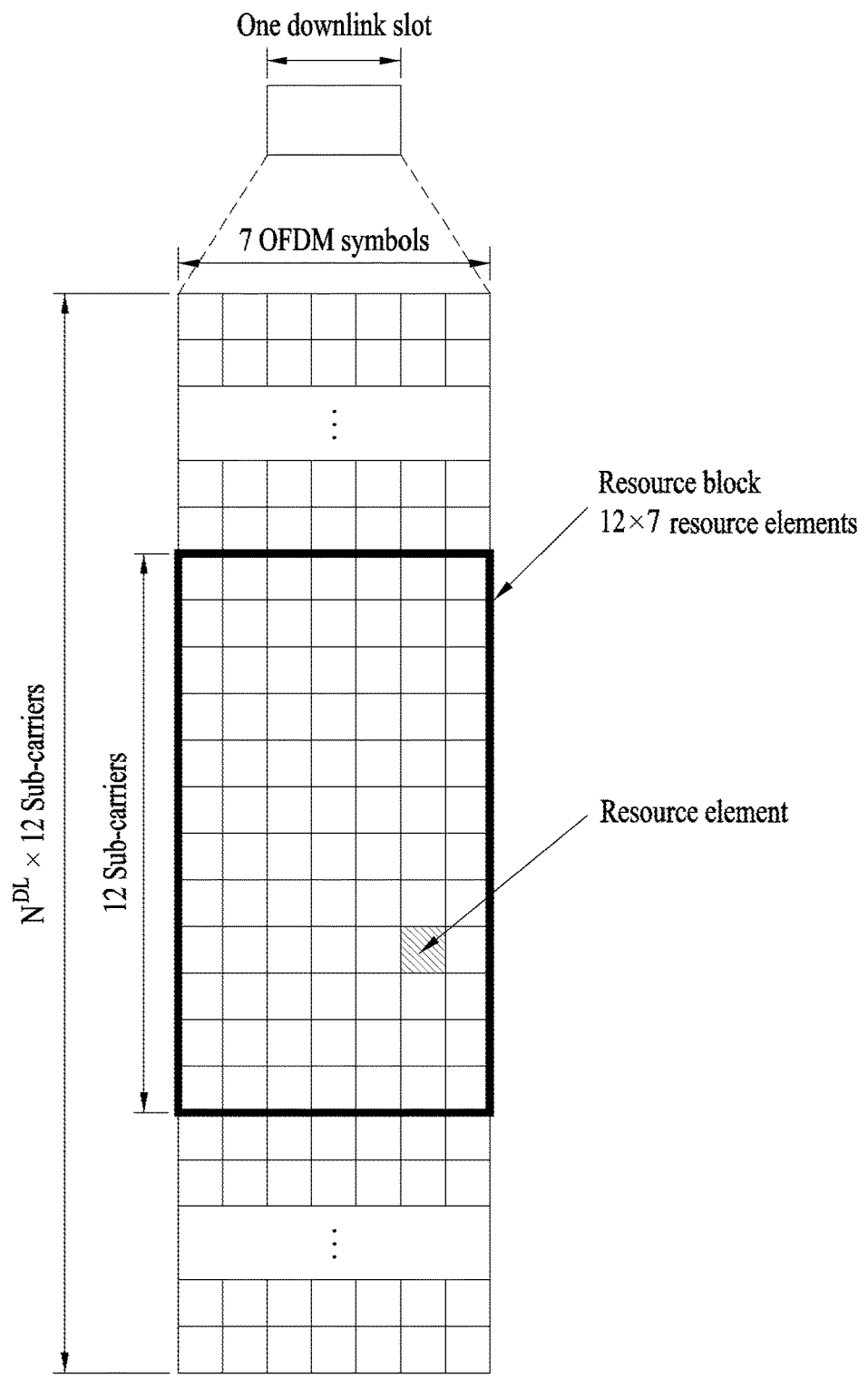
FIG. 2 is a diagram to illustrate a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
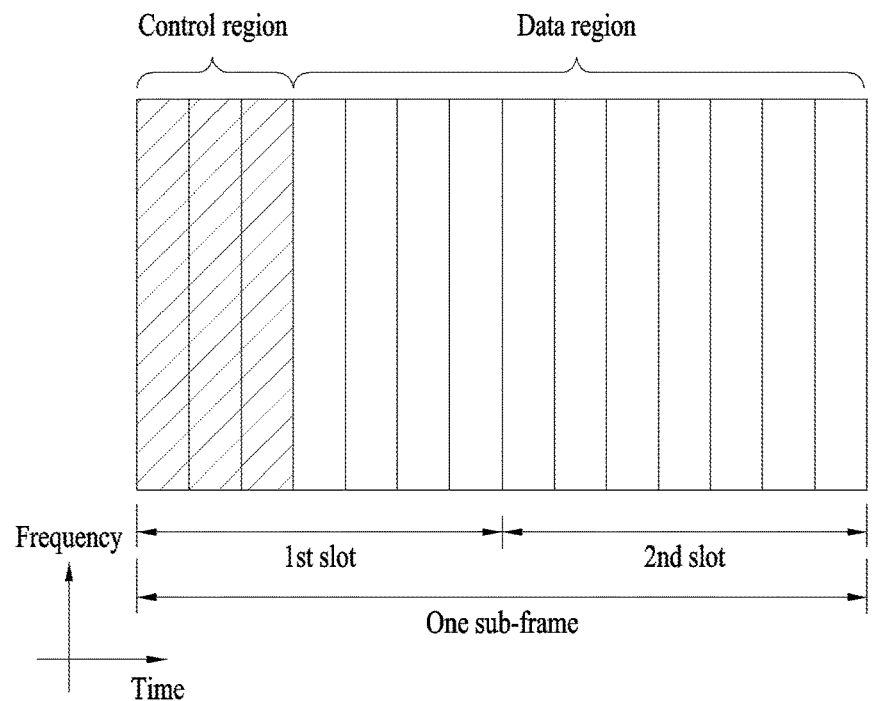
FIG. 3 is a diagram to illustrate a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
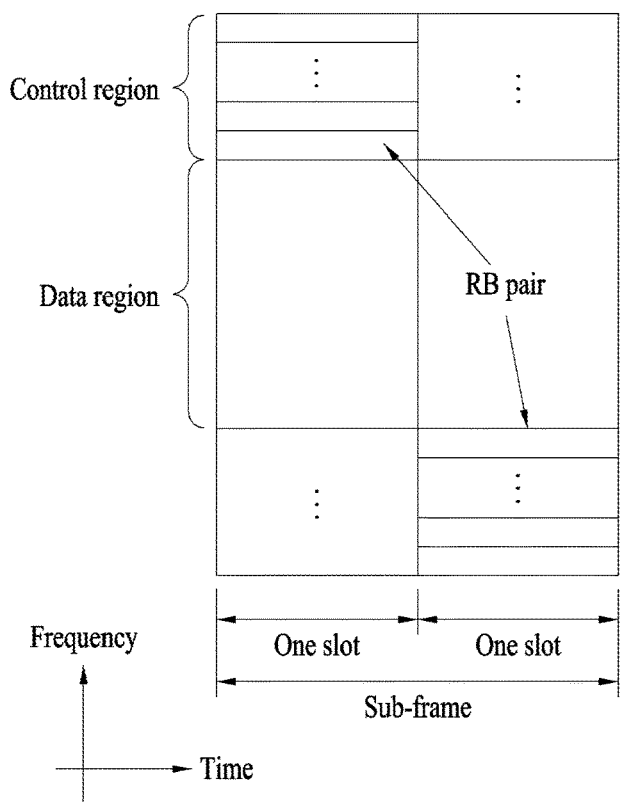
FIG. 4 is a diagram to illustrate a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1, n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} =$$ [Equation 10]

$$\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Based on the foregoing description and an existing LTE/LTE-A system, UE-to-UE synchronization acquisition in D2D communication is described as follows. In OFDM system, if time/frequency synchronization is not matched, multiplexing between different user equipments may become impossible in OFDM signal due to inter-cell interference. In order to match synchronization, it is inefficient for all user equipments (UEs) to individually perform synchronization by directly transceiving synchronization signals. Hence, in a distributed node system such as D2D, a specific node sends a representative synchronization signal and then the rest of UEs can match synchronization with it. In other words, for D2D signal transmission and reception, the following method can be used. First of all, some nodes (herein, a node may include an eNB, a UE, or an SRN (synchronization reference node (or, possibly called a synchronization source).), i.e., synchronization sources periodically send D2D synchronization signals (D2DSS) and then the rest of UEs transceive signals by matching the synchronization to the D2DSS.

A transmission period of D2DSS is not smaller than 40 ms, and at least one symbol in a subframe may be used for a transmission of D2DSS.

D2D synchronization signals may include a primary synchronization signal (PD2DSS or PSSS (primary sidelink synchronization signal) and a secondary synchronization signal (SD2DSS or SSSS (secondary sidelink synchronization signal). PD2DSS may have a similar/modified/repeated structure of a prescribed-length Zadoff-Chu sequence or PSS, or the like. SD2DSS may have a similar/modified/repeated structure of an M-sequence or SSS, or the like.

When a D2D UE selects a D2D synchronization source, the same priority reference should apply thereto. In an out-of-coverage situation, if signal strength of all received D2DSS is equal to or smaller than a preset value, a UE can become a synchronization source. If UEs match synchronization from eNB, a synchronization source may be the eNB and D2DSS may be PSS/SSS. D2DSS of a synchronization source derived from an eNB may be different from D2DSS of a synchronization source not derived from the eNB.

PD2DSCH (physical D2D synchronization channel) may include a channel for transmitting (or broadcasting) information (or system information) (e.g., D2DSS related information, duplex mode (DM), TDD UL/DL configuration, resource pool related information, a type of D2DSS related application, etc.) that becomes information a UE should know above all before D2D signal transmission and reception. PD2DSCH may be transmitted in the same subframe of D2DSS or a following subframe.

D2DSS may have a specific sequence form, and PD2DSCH may include a sequence that indicates specific information or a codeword form after completion of predetermined channel coding. Herein, SRN may include eNB or specific D2D UE. In case of partial network coverage or an out-of-network coverage, a UE may become a synchronization source.

Figure 6:
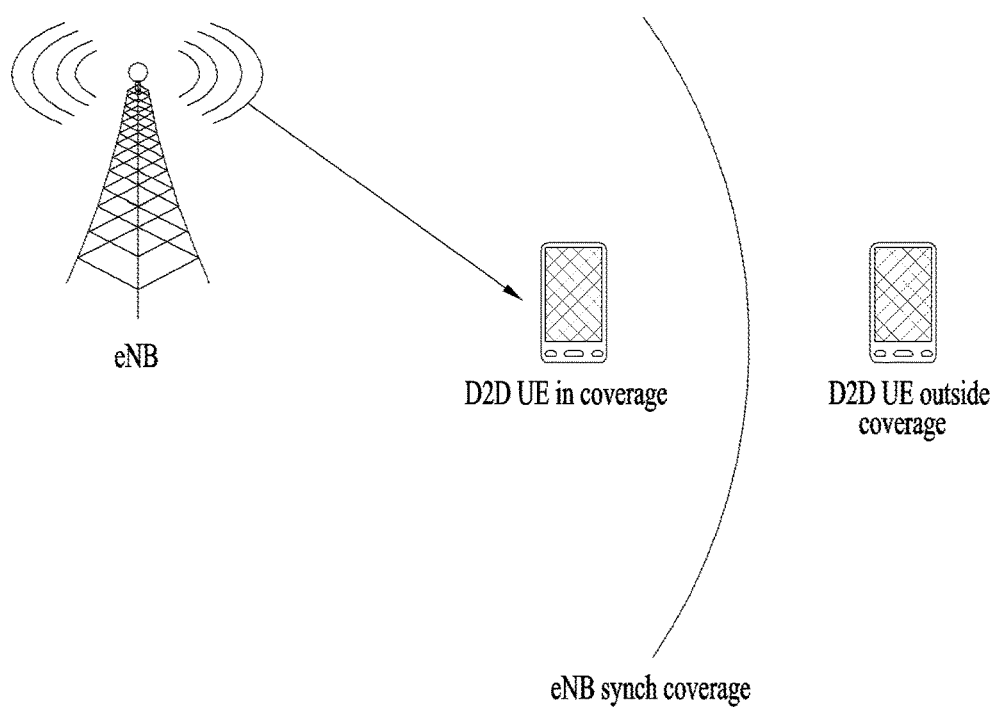

In a situation shown in FIG. 6, D2DSS may be relayed for D2D communication with a UE out of coverage. And, D2DSS may be relayed through multiple hops. In the following description, if a synchronization signal is relayed, it means that a synchronization signal of a base station is directly AF-relayed, and also includes the concept of transmitting a D2D synchronization signal in separate format by a synchronization signal received timing. Thus, as a D2D synchronization signal is relayed, a UE in coverage and a UE out of coverage can communicate with each other in direct.

D2D Resource Pool

FIG. 7 shows one example of a resource pool in D2D communication environment. UE 1 shown in FIG. 7 (a) may select a resource unit corresponding to a specific resource from a resource pool that means a set of a series of resources and then transmit D2D signal using the selected resource unit. A resource pool for enabling the UE 1 to transmit a signal is configured for UE 2. The UE 2 is then able to detect the signal of the UE 1. Herein, the configuration of the resource pool may be transmitted from a base station in a manner of being contained in system information. If information on a resource pool fails to be contained in system information, the configuration of the resource pool may be sent in response to a request made by a UE. In case of a UE out of coverage of a base station, such a configuration is indicated by another UE (e.g., D2D relay UE) or a preset resource region may be usable.

A resource pool may be configured with a plurality of resource units, and a UE may transmit a D2D signal through at least one resource unit. FIG. 7 (b) shows an example of a resource unit. In particular, as a whole frequency resource is divided into NF resources and a whole time resource is divided into NT resources, total NF*NT resource units can be defined. A resource unit may be repeated by periods of NT subframes. In order to obtain a diversity effect in a time or frequency dimension, an index of a physical resource unit having a single logical resource unit mapped thereto may be changed in a predetermined pattern according to a time. In such a resource unit structure, a resource pool may mean a set of resource units that can be used for a transmission by a UE desiring to transmit a D2D signal.

The resource pool may be identified depending on what kind of D2D signal is transmitted. For instance, a resource pool can be identified per D2D control channel (SA (scheduling assignment)), D2D data channel or D2D discovery channel. Several resource pools may be configured for each D2D signal type. SA may mean a signal containing information such as MCS (modulation and coding scheme) required for a location of a resource and demodulation of other data channel, (transmitting or receiving) UE ID, MIMO transmission scheme, timing advance, etc. This signal can be transmitted by being multiplexed with D2D data on the same resource unit. In this case, an SA resource pool may mean a pool of a resource on which SA is transmitted by being multiplexed with D2D data. A resource pool for D2D data channel may mean a pool of a resource used for a transmitting UE to transmit user data using a resource designated through SA. If it is also possible to be transmitted by being multiplexed on the same resource unit with D2D data, a D2D data channel of an SA information excluded type may be transmitted only in a resource pool for D2D data channel. In other words, in a D2D data channel resource pool, RE previously used in transmitting SA information on an individual resource unit within an SA resource pool is still used in transmitting D2D data. A resource pool for a discovery signal means a resource pool for a message for a transmitting UE to enable an adjacent UE to discover the transmitting UE by transmitting information of ID and the like of the transmitting UE. PD2DSCH (physical D2D synchronization channel): This is a channel transmitted together with a D2D synchronization signal (D2DSS) in a manner similar to PBCH and contains information such as system bandwidth, TDD configuration, system frame number, etc.

In case that a form/type/content of a D2D signal is identical, a different resource pool can be used according to a transmission/reception attribute of the D2D signal. For instance, despite a same D2D data channel or a same discovery message, depending on a transmission timing determining manner of a D2D signal (e.g., whether transmitted at a received timing of a synchronization reference signal, whether transmitted by applying a uniform timing advance at the received timing, etc.), a resource allocation manner of a D2D signal (e.g., whether a base station designates a transmission resource of an individual signal to an individual transmitting UE, whether an individual transmitting UE selects an individual signal transmission resource by itself), a signal format (e.g., the number of symbols occupied in a single subframe by each D2D signal, the number of subframes used for a transmission of a single D2D signal), a signal strength from a base station, a transmission power strength of a D2D UE, or the like, the channel or message can be identified as a different resource pool again. For clarity of the description, in a D2D communication, a method for a base station to directly indicate a transmission resource of a D2D transmitting UE shall be named Mode 1, and a method for a UE to directly select a transmission resource when a transmission resource region is previously configured or designated by a base station shall be named Mode 2. In D2D discovery, if a base station directly indicates a resource, it shall be named Type 2. If a UE directly selects a transmission resource from a previously configured resource region or a resource region indicated by the base station, it shall be named Type 1.

TA Application & Requirement

In LTE system, having received a TA command from an eNB in $n^{th}$ SF, a UE is set to apply the TA command by starting with UE SF of n+6.

In case of applying a TA command, an initial timing error of a UE should be equal to or smaller than $T_e$. Such restriction is applied in case of an initial transmission in DRX cycle for PUCCH, PUSCH, SRS or PRACH transmission. A reference point of an initial transmission timing control request of a UE should be a value resulting from subtracting $(N_{TA\_Ref}+N_{TA\ offset}) \times T_s$ from a downlink timing of a reference cell. The downlink timing is a timing of receiving an initially detected path corresponding to a downlink frame from a reference cell. On PRACH, $N_{TA\_Ref}$ is 0. $(N_{TA\_Ref}+N_{TA\ offset})$ of a channel other that PRACH is different between a transmission timing of a UE and a downlink timing right after applying a timing advance. $N_{TA\_Ref}$ of a channel other than PRACH is not changed until a next timing advance is received.

When it is not a first transmission of DRX cycle or there is no DRX cycle, in case of PUCCH, PUSCH or SRS transmission, a UE can change a transmission timing according to a downlink frame received from a reference cell except a case that a timing advance is applied. If a transmission timing error between UE and reference timings exceeds $\pm T_e$, the UE is requested to adjust its timing within $\pm T_e$. Herein, a reference timing between a downlink timing of a reference cell is $(N_{TA\_Ref}+N_{TA\ offset}) \times T_s$. A timing adjustment of a UE uplink is maximum $T_q$, a minimum aggregate adjustment rate should be 7 $T_s$ per second, and a maximum aggregate adjustment rate should be $T_q$ per 200 ms. The $T_q$ according to bandwidth is exemplarily shown in Table 1.

TABLE 1

| Downlink Bandwidth (MHz) | $T_{q\_}$ |
|---|---|
| 1.4 | $17.5*T_S$ |
| 3 | $9.5*T_S$ |
| 5 | $5.5*T_S$ |
| ≥10 | $3.5*T_S$ |

Note:
$T_S$ is the basic timing unit defined in LTE specification TS 36.211

For instance, assume that there is a UE operating in 10 MHz bandwidth system. If this UE receives 160 Ts as a TA command in subframe n, the UE initially applies the TA in (160±12) Ts and is then able to vary it by maximum 3.5 Ts unit. Hence, in order to accurately apply 160 Ts TA, maximum 12/3.5~685 ms is consumed.

Namely, in a current LTE system, TA is not applied right after a TA command has been received (after subframe (n+6) at least). And, the TA is applied in a manner of gradually moving a TA value with a predetermined error despite applying the TA command at a time. In this case, when a D2D transmitting UE receives a TA command, how to determine and transmit a TA value (TA command) will be problematic in case of SA transmission. Namely, in receiving a TA command in subframe n and transmitting an uplink signal by applying the TA command in subframe n+6, if a UE transmits SA before the subframe n+6, the SA contains a TA value. How to define the TA is described as follows. For clarity of the description, a TA value before subframe n shall be named an old TA and a TA indicated in the subframe n shall be named a new TA. In the following description, 'TA value' means that TA command received from a base station is transmitted on SA at a time. And, a TA adjustment value indicates a TA value transmitted on SA in case of 1 SA transmission when a TA command value received on the SA from the base station is transmitted in a manner of being split on several SA transmissions.

Embodiment 1

Figure 8:
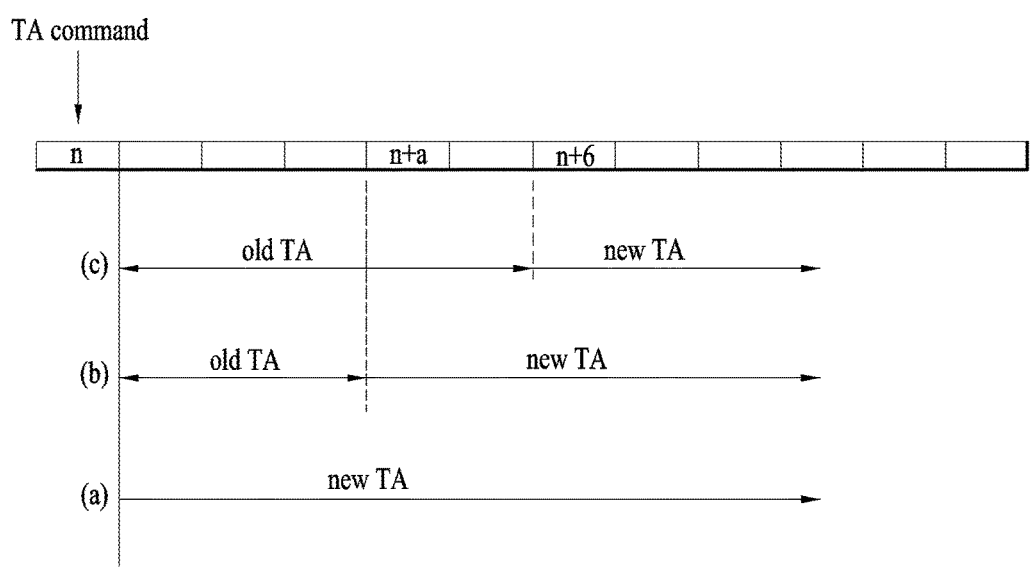
FIG. 8 is a diagram to describe TA transmission according to an embodiment of the present invention.

FIG. 8 shows various embodiments for how to determine TA to be transmitted by being contained in SA.

Embodiment 1-1

This is a case of FIG. 8 (a). With reference to a subframe n in which a TA command is received, a new TA value or an adjustment value for a new TA can be included in an SA transmitted after subframe n. In transmitting data for tens of milliseconds after SA transmission, if a transmission is performed with an old TA only, it is unable to correctly receive a number of data packets. So, this can be prevented. In doing so, if is able to consider a time delay required for SA encoding of a new TA value. For instance, if a UE determines that a time of x ms is necessary for encoding, a transmission can be performed by performing encoding in a manner that a TA value before x ms of a real SA transmission is included in SA. This may vary according to implementation of a UE. Since encoding/decoding time of 4 ms is generally secured in LTE system, x may be 4. The present embodiment intends to perform a transmission in a manner that a latest TA value before SA transmission is included in SA instead of setting a TA value depending on an encoding/decoding time. Namely, since an encoding time may differ depending on an implementation of a UE, what kind of TA value will be included in SA may vary per UE. Yet, if a latest TA value is transmitted by each UE in a manner of being included in SA, a receiving UE can be aware of a TA value as accurate as possible.

Embodiment 1-2

Referring to FIG. 8 (b), from subframe n before subframe n+a, an old TA value or an adjustment value for the old TA value is included in SA. After subframe n+1, a new TA value or an adjustment value for the new TA value can be included in SA. Herein, 'a' may be a predetermined value (1<a<6). In case of Embodiment 1-2, new TA application is performed earlier. Through this, a processing time required for receiving and applying a TA command can be secured. Particularly, considering that a PDSCH decoding time of about 3 ms is necessary, 'a' may be preferably set to 3 or 4. For example of a case of a=4, in transmitting SA in n+5, a UE signals a new TA with SA. This may be particularly effective in that a new TA applied D2D transmission is possible by starting with n+6 for a next D2D transmission.

Embodiment 1-3

This is a case shown in FIG. 8 (c). After subframe n before subframe n+6, an old TA value or an adjustment value for the old TA value can be included in SA.

Embodiment 2

In each case of Embodiment 1 (particularly, case of Embodiment 1-3, if a big TA change occurs from a TA command, there may be a big difference between a TA value indicated by a base station and a TA value transmitted on SA. Moreover, if a UE transmits D2D data by applying a TA different from a TA command value within an error range instead of exactly applying a TA command indicated by a base station, a TA indicated through SA may be different from a TA of a real D2D data. In order to reduce such a difference, the following embodiments are applicable.

Embodiment 2-1

A UE receives a TA command in subframe n and transmits an uplink signal in subframe n+6 by applying the TA command. When such a UE transmits SA before the subframe n+6, if the SA is transmitted in subframe n+b (1<b<6), a TA value included in the SA may be a TA value applied to the subframe n+b. On the SA transmitted after the subframe n+b (where, b is equal to or greater than 1 and determined in advance), a TA value applicable in a subframe for a transmitting UE to transmit SA actually is transmitted instead of a TA command value received from a base station. Herein, a TA value applied to the subframe n+b may correspond to a value resulting from changing a value of the received TA command (i.e., new TA). And, such a change may include a change of 3.5 Ts per 200 ms. In this case, a tolerance may be ±12 Ts. Of course, such a change is selectively applied by a UE. Alternatively, the TA value applied to the subframe n+b may be a value resulting from applying a change to an old TA.

Embodiment 2-2

On SA transmitted after subframe n+b (where, b is equal to or greater than 1 and determined in advance), a TA value applicable in a subframe for a transmitting UE to transmit a D2D signal actually is transmitted instead of a TA command value received from a base station. Through this, a timing of an actually D2D data transmitted subframe can be indicated.

Embodiment 2-3

On SA transmitted after subframe n+b (where, b is equal to or greater than 1 and determined in advance), an average value of TA values actually applied by a transmitting UE within a period of a D2D resource pool is transmitted instead of a TA command value received from a base station. According to this method, since it is difficult to indicate a timing between SA transmission periods due to the characteristics of D2D communication, in order to indicate a timing used by a transmitting UE as accurate as possible, an average value used for an actual D2D data transmission between SA periods is indicated through the SA.

Embodiment 2-4

On SA transmitted after subframe n+b (where, b is equal to or greater than 1 and determined in advance), a TA value actually applied by a transmitting UE in first subframe of a D2D resource pool is transmitted instead of a TA command value received from a base station.

Embodiment 2-4

On SA transmitted after subframe n+b (where, b is equal to or greater than 1 and determined in advance), a TA value actually applied by a transmitting UE in $n^{th}$ subframe of a D2D resource pool is transmitted instead of a TA command value received from a base station. Herein, n may include a predetermined value. For instance, if a single period of the D2D resource pool is configured with T subframes, n may be set to T/2.

According to the above embodiments, what kind of TA will be included in the SA is determined by a location (index) of an SA transmitted subframe. Yet, if SA is repeatedly transmitted in a period of SA pool, how to process the transmission SA after the second may become a problem. Hence, a processing in case of repeatedly transmitting SA is described as follows.

Embodiment 3-1

If a location of SA initially (or finally) transmitted within SA period by a UE having received a TA command in subframe n is before n+6, an old TA value or an adjustment value for an old TA can be always transmitted. According to this method, in transmitting SA several times, a UE transmits the SA by setting an equal TA value according to a location of an initial (or final) transmission within an SA period. For instance, if a UE transmits SA within SA period twice or more, an SA after the second can be transmitted in a manner that a TA value applied in a subframe for transmitting a first SA is included in the SA.

Embodiment 3-2

If a location of a subframe for a UE having received a TA command in subframe n to transmit $k^{th}$ SA is before n+6, an old TA value or an adjustment value for an old TA can be always transmitted. Herein, k may be determined in advance as a specific value among values equal to or smaller than an SA repetition count within at least one period, or signaled as physical or higher layer signal by a network.

Embodiment 3-3

If a UE having received a TA command in subframe n transmits an initial (or final) SA after subframe n+1 within SA period, it can always transmit a new TA value on the SA and also transmit an old TA value until the subframe n+1. Herein, a value of 'a' is greater than 1 and smaller than 6 and may be set to a specific value in advance. For example of a case of a=4, if a location of an initially (or finally) transmitted SA is n+5, a new TA is transmitted. Like Embodiment 3-1, a TA value can be set equal for each SA transmission in the SA resource pool. A difference from Embodiment 3-1 lies in that a new TA can be applied more quickly by setting 'a' to a value smaller than 6. Hence, it is advantageous in transmitting a more accurate TA value when D2D data is transmitted for tens of milliseconds thereafter.

Embodiment 3-4

If a UE having received a TA command in subframe n transmits a $k^{th}$ SA after subframe n+a within SA period, it can always transmit a new TA value on the SA and also transmit an old TA value until the subframe n+a. Herein, a value of 'a' is greater than 1 and smaller than 6 and may be set to a specific value in advance. Herein, k may be determined in advance as a specific value among values equal to or smaller than an SA repetition count within at least one period, or signaled as physical or higher layer signal by a network.

Embodiment 3-5

In a subframe for transmitting an initial (or final) SA within a period after subframe n+b (where, b is equal to or greater than 1 and determined in advance), a TA value actually transmittable by a UE can be transmitted in a manner of being included in the SA. In case that SA is repeatedly transmitted within a period, in an SA transmission other than an initial (or final) transmission, a TA value can be transmitted in a manner of being set to the same TA value set in the initial SA transmitted subframe within the period. According to this method, as the UE transmits an actually applied TA value after the TA command reception, it is advantageous in informing a receiving UE of a more accurate TA value. Moreover, in case that several SA transmissions occur within a period, the same value is transmitted. Hence, an SA receiving UE can combine such values.

Embodiment 3-6

In a subframe for transmitting $k^{th}$ SA within a period after subframe n+b (where, b is equal to or greater than 1 and determined in advance), a TA value actually transmittable by a UE can be transmitted in a manner of being included in the SA. In case that SA is repeatedly transmitted within a period, in an SA transmission other than the $k^{th}$ SA transmission, a TA value is proposed to be transmitted in a manner of being set to the same TA value set in the kth SA transmitted subframe. Embodiment 3-6 is a generalization of Embodiment 3-5 and is intended to be non-limited by the subframe for transmitting an initial or final SA only. Herein, k may be determined in advance as a specific value among values equal to or smaller than an SA repetition count within at least one period, or signaled as physical or higher layer signal by a network.

According to the respective embodiments mentioned in the foregoing description, when SA is repeated, since TA included in the SA varies, it is able to solve the problem that a UE receiving TAs is unable to combine them. Moreover, Due to the half-duplex constraint, UEs capable of receiving a single one of several SAs receive different TAs, respectively. Hence, it is able to solve a problem that TA is determined as different between UEs.

Device Configuration According to Embodiment of Present Invention

Figure 9:
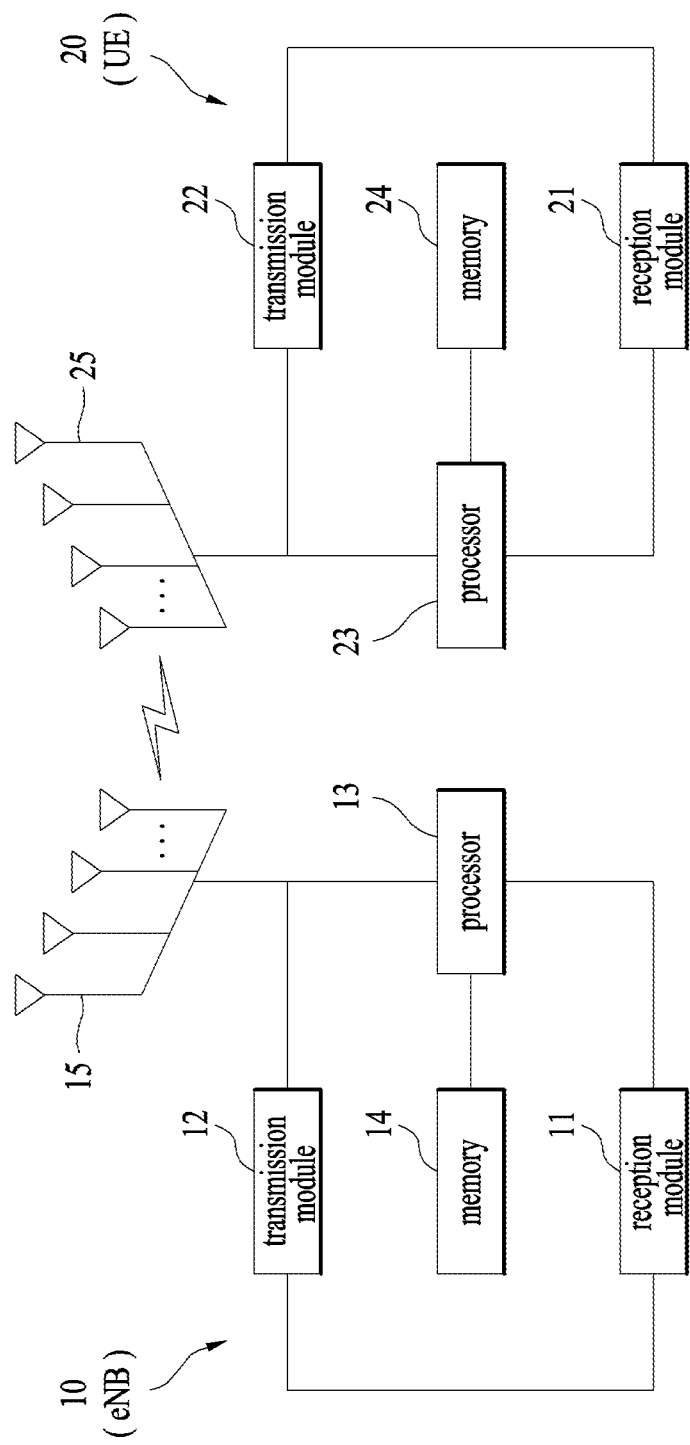
FIG. 9 is a diagram to illustrate configuration of a transceiver device.

FIG. 9 is a diagram for a configuration of a transmitting point device and a user equipment device according to one embodiment of the present invention.

Referring to FIG. 9, a transmitting point device 10 according to the present invention may include a receiving module 11, a transmitting module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and can be substituted with such a component as a buffer (not shown in the drawing) and the like.

Referring still to FIG. 9, a user equipment device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a transmitting point. The transmitting module 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description.

The processor 23 of the user equipment device 20 performs functions of operating and processing information received by the user equipment device 20, information to be transmitted by the user equipment device 20, and the like. The memory 24 can store the operated and processed information and the like for a prescribed period and can be substituted with such a component as a buffer (not shown in the drawing) and the like.

In the above-mentioned detailed configurations of the transmitting point device and the user equipment device, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 10 with reference to FIG. 9 may be identically applicable to a relay node device as a DL transmitting entity or a UL receiving entity. And, the description of the user equipment device 20 with reference to FIG. 9 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of transmitting an uplink signal by a user equipment in a wireless communication system, comprising:

receiving a TA command in subframe n; and transmitting the uplink signal by applying the TA command in subframe n+6, wherein if the user equipment transmits SA (scheduling assignment) in subframe n+b (1<b<6), the SA includes a TA value and wherein the TA value comprises a TA value applied to the subframe n+b.

2. The method of claim 1, wherein the TA value applied to the subframe n+b is obtained by applying a change to a value of the received TA command.

3. The method of claim 2, wherein the change applied to the value of the received TA command is a change of 3.5 Ts per 200 ms.

4. The method of claim 2, wherein the change applied to the value of the TA command is selectively applied by the user equipment.

5. The method of claim 1, wherein if the user equipment transmits the SA at least two times within an SA period, the SA after a second SA transmission includes a TA value included in a first SA transmission.

6. The method of claim 5, wherein the TA value included in the first SA transmission is a value applied to the subframe n+b.

7. In transmitting an uplink signal in a wireless communication system, a user equipment, comprising:

a transmitting module; and a processor configured to receive a TA command in subframe n and transmit the uplink signal by applying the TA command in subframe n+6, wherein if the user equipment transmits SA (scheduling assignment) in subframe n+b (1<b<6), the SA includes a TA value and wherein the TA value comprises a TA value applied to the subframe n+b.

8. The user equipment of claim 7, wherein the TA value applied to the subframe n+b is obtained by applying a change to a value of the received TA command.

9. The user equipment of claim 8, wherein the change applied to the value of the received TA command is a change of 3.5 Ts per 200 ms.

10. The user equipment of claim 8, wherein the change applied to the value of the TA command is selectively applied by the user equipment.

11. The user equipment of claim 7, wherein if the user equipment transmits the SA at least two times within an SA period, the SA after a second SA transmission includes a TA value included in a first SA transmission.

12. The user equipment of claim 11, wherein the TA value included in the first SA transmission is a value applied to the subframe n+b.

* * * * *